United States Patent
Miller et al.

(10) Patent No.: US 11,773,738 B2
(45) Date of Patent: Oct. 3, 2023

(54) RADIAL LIFT SEAL

(71) Applicant: Raytheon Technologies Corporation, Farmington, CT (US)

(72) Inventors: Jonathan Logan Miller, Belchertown, MA (US); Jonathan F. Zimmitti, Glastonbury, CT (US); Benstone Schwartz, Sanford, FL (US); Jeffrey E. Tessier, Hobe Sound, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/546,762

(22) Filed: Dec. 9, 2021

(65) Prior Publication Data
US 2023/0184122 A1   Jun. 15, 2023

(51) Int. Cl.
*F01D 11/00* (2006.01)
*F01D 25/16* (2006.01)

(52) U.S. Cl.
CPC ............ *F01D 11/003* (2013.01); *F01D 25/16* (2013.01); *F05D 2240/50* (2013.01); *F05D 2240/55* (2013.01); *F05D 2250/294* (2013.01); *F05D 2250/38* (2013.01)

(58) Field of Classification Search
CPC .... F01D 11/003; F01D 25/16; F05D 2240/50; F05D 2240/55; F05D 2250/294; F05D 2250/38
See application file for complete search history.

(56) References Cited

U.S. PATENT DOCUMENTS

| | | | |
|---|---|---|---|
| 4,971,306 A | 11/1990 | Jinnouchi et al. | |
| 6,811,154 B2 | 11/2004 | Proctor et al. | |
| 7,931,277 B2 | 4/2011 | Garrison | |
| 7,963,525 B1 | 6/2011 | Garrison | |
| 9,194,424 B2 | 11/2015 | Garrison | |
| 9,353,639 B2 | 5/2016 | Garrison | |
| 9,970,482 B2 | 5/2018 | Garrison | |
| 10,718,348 B2 * | 7/2020 | Yamaguchi | F04D 29/669 |
| 11,274,571 B2 * | 3/2022 | Campo | F16J 15/162 |
| 2004/0150164 A1 * | 8/2004 | Morgan | F16J 15/442 |
| | | | 277/345 |

(Continued)

FOREIGN PATENT DOCUMENTS

| | | | | |
|---|---|---|---|---|
| DE | 3840487 A | * | 7/1989 | ............ F01D 11/003 |
| WO | 2014088608 | | 6/2014 | |

OTHER PUBLICATIONS

DE3840487 A espacenet translation (Year: 1987).*
European Search Report for European Patent Application No. 22212600.5 completed on Apr. 25, 2023.

*Primary Examiner* — Christopher Verdier
*Assistant Examiner* — Ryan C Clark
(74) *Attorney, Agent, or Firm* — Carlson, Gaskey & Olds, P.C.

(57) ABSTRACT

A bearing compartment seal for a gas turbine engine includes a seal ring that defines an axis and has a radially inward facing sealing surface. A seal runner is configured to rotate relative to the seal ring. The seal runner has a runner surface facing the radially inward facing sealing surface. A plurality of grooves are spaced circumferentially along the runner surface. The plurality of grooves have a length in an axial direction that is at least 50% of an axial length of the runner surface.

20 Claims, 8 Drawing Sheets

(56) References Cited

U.S. PATENT DOCUMENTS

| | | | |
|---|---|---|---|
| 2004/0155410 A1* | 8/2004 | Proctor | F16J 15/164 |
| | | | 277/409 |
| 2011/0049809 A1* | 3/2011 | Garrison | F16J 15/442 |
| | | | 277/423 |
| 2013/0241153 A1* | 9/2013 | Garrison | F02C 7/28 |
| | | | 277/350 |
| 2013/0251523 A1* | 9/2013 | Garrison | F16J 15/441 |
| | | | 415/231 |
| 2015/0049968 A1* | 2/2015 | Garrison | F16J 15/441 |
| | | | 384/115 |
| 2017/0009596 A1* | 1/2017 | Schwarz | F01D 11/08 |
| 2019/0376402 A1* | 12/2019 | Theratil | F16J 15/441 |
| 2020/0116047 A1* | 4/2020 | Theratil | F01D 25/183 |

* cited by examiner

RADIAL LIFT SEAL

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Included within gas turbine engines are multiple bearings which allow relative movement between internal components of the gas turbine engine. The bearings are contained within bearing compartments and in some examples a lubricant, such as oil, is sprayed into the bearing compartment. The lubricant decreases wear and degradation of the bearing(s) contained within the bearing compartment. In order to prevent the lubricant from contacting and negatively impacting engine components adjacent to the bearing compartment, bearing compartment seals are included within the bearing compartment housing.

SUMMARY OF THE INVENTION

In one exemplary embodiment, a bearing compartment seal for a gas turbine engine includes a seal ring that defines an axis and has a radially inward facing sealing surface. A seal runner is configured to rotate relative to the seal ring. The seal runner has a runner surface facing the radially inward facing sealing surface. A plurality of grooves are spaced circumferentially along the runner surface. The plurality of grooves have a length in an axial direction that is at least 50% of an axial length of the runner surface.

In another embodiment according to any of the previous embodiments, the length of the plurality of grooves in the axial direction is at least 70% of an axial length of the runner surface.

In another embodiment according to any of the previous embodiments, the sealing surface has a first edge spaced from a second edge in an axial direction to define the axial length of the runner surface. The seal runner has a first chamfer at the first edge and a second chamfer at the second edge.

In another embodiment according to any of the previous embodiments, the plurality of grooves each extend at an angle less than about 45° relative to the axis.

In another embodiment according to any of the previous embodiments, the plurality of grooves each extend at an angle between about 13° and about 17° relative to the axis.

In another embodiment according to any of the previous embodiments, the runner surface has a coating that extends a coating length along a portion of the runner surface in the axial direction. The plurality of grooves are at least partially formed in the coating.

In another embodiment according to any of the previous embodiments, the coating includes a coating thickness. A depth of the grooves is less than the coating thickness.

In another embodiment according to any of the previous embodiments, a ratio of coating thickness to the depth of the grooves is at least 4.

In another embodiment according to any of the previous embodiments, an axial length of the grooves is larger than the coating length.

In another embodiment according to any of the previous embodiments, an axial length of the grooves is smaller than the coating length.

In another embodiment according to any of the previous embodiments, a ratio of a width of the grooves to a depth of the grooves is at least 90.

In another exemplary embodiment, a gas turbine engine includes an engine core comprising a compressor. A combustor is fluidly connected to the compressor. A turbine is fluidly connected to the combustor. An engine static structure is supported relative to a shaft within the core via at least one bearing system disposed within a bearing compartment. A bearing compartment seal disposed in the bearing compartment. The bearing compartment seal has a seal ring that extends about the engine axis and has a radially inward facing sealing surface and a seal runner configured to rotate relative to the seal ring. The seal runner has a runner surface facing the radially inward facing sealing surface. A plurality of grooves are spaced circumferentially along the runner surface. The plurality of grooves have a length in an axial direction that is at least 50% of an axial length of the runner surface.

In another embodiment according to any of the previous embodiments, the sealing surface has a first edge spaced from a second edge in an axial direction to define the axial length of the runner surface. The seal runner has a first chamfer at the first edge and a second chamfer at the second edge.

In another embodiment according to any of the previous embodiments, the plurality of grooves each extend at an angle less than about 45° relative to the axis.

In another embodiment according to any of the previous embodiments, the seal ring is supported axially forward and aft by a housing.

In another embodiment according to any of the previous embodiments, the runner surface has a coating that extends a coating length along a portion of the runner surface in the axial direction. The plurality of grooves are at least partially formed in the coating.

In another embodiment according to any of the previous embodiments, the coating includes a coating thickness and a depth of the grooves is less than the coating thickness.

In another embodiment according to any of the previous embodiments, an axial length of the grooves is larger than the coating width.

In another embodiment according to any of the previous embodiments, an axial length of the grooves is smaller than the coating width.

In another embodiment according to any of the previous embodiments, a ratio of a width of the grooves to a depth of the grooves is at least 90.

The present disclosure may include any one or more of the individual features disclosed above and/or below alone or in any combination thereof.

DETAILED DESCRIPTION

Figure 1:
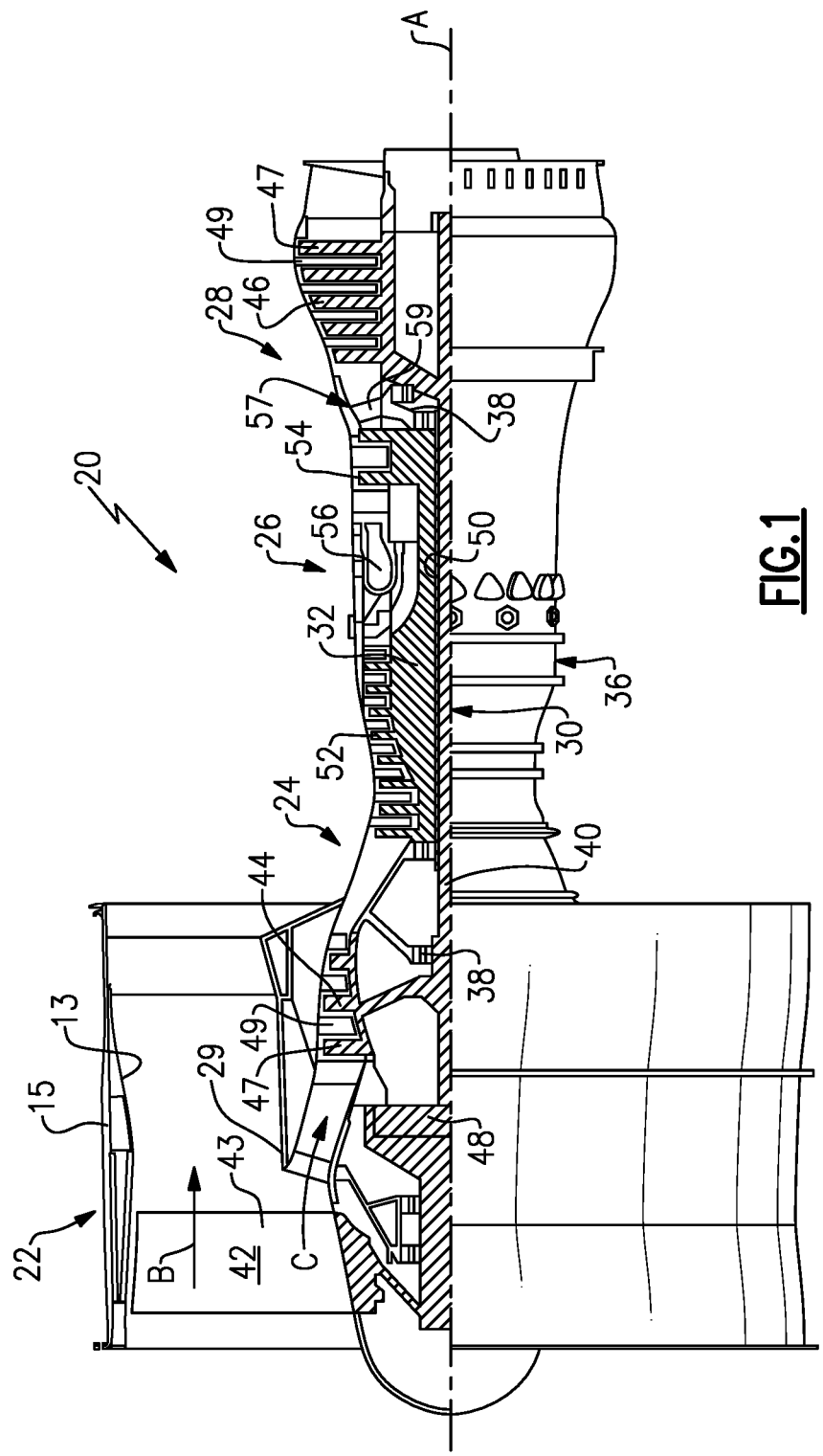
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram } °R)/(518.7° R)]^{0.5}$. The corrected fan tip speed can be less than or equal to 1150.0 ft/second (350.5 meters/second), and can be greater than or equal to 1000.0 ft/second (304.8 meters/second).

Figure 2:
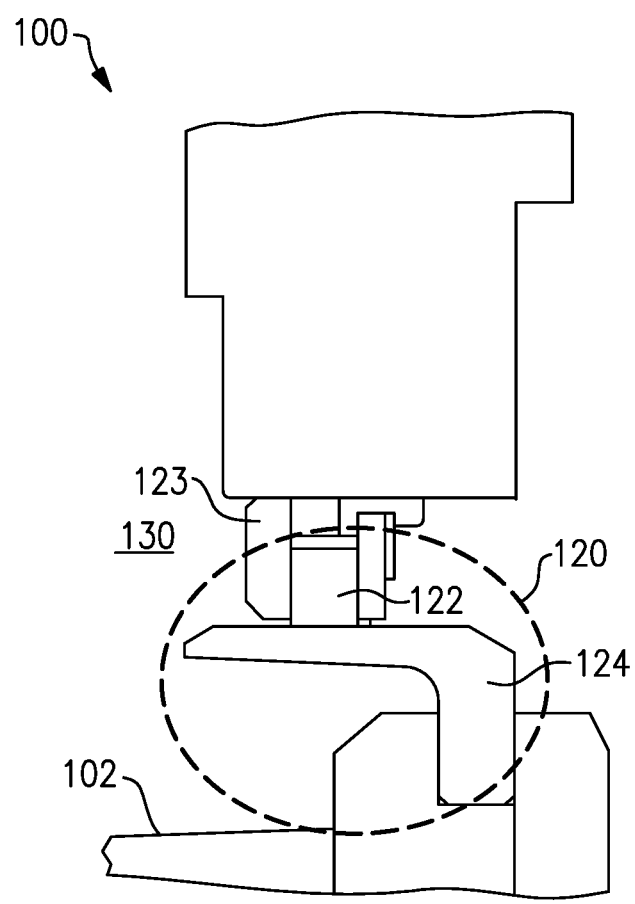
FIG. 2 schematically illustrates a portion of an exemplary bearing compartment for the gas turbine engine of FIG. 1.

With continued reference to FIG. 1, FIG. 2 schematically illustrates a cross section of a portion of a bearing compartment 100 including the bearing systems 38 of FIG. 1. The bearing compartment 100 includes a bearing (not shown) contacting a shaft 102. A bearing compartment seal 120 is spaced from the bearing via a plenum 130 and includes a seal ring 122 adjacent a seal runner 124. The seal ring 122 may be supported by a housing 123, for example. In this example, the housing 123 supports the seal ring 122 axially forward and aft of the seal ring 122. In some examples, the housing 123 may provide a secondary seal face. The seal ring 122 may be a carbon seal. The seal runner 124 is a ring, and is coaxial with the shaft 102. During operation of the gas turbine engine 20, the seal ring 122 remains static, while the runner 124 rotates along with the shaft 102. A seal is formed at the seal 120 by the radially inward facing surface of the seal ring 122 and the radially outward facing surface of the seal runner 124. While illustrated as directly contacting each other, it is appreciated that in the cool state, a gap can exist between the radially inward facing surface of the seal rings 122 and the radially outward facing surface of the seal runner 124.

Figure 3A:
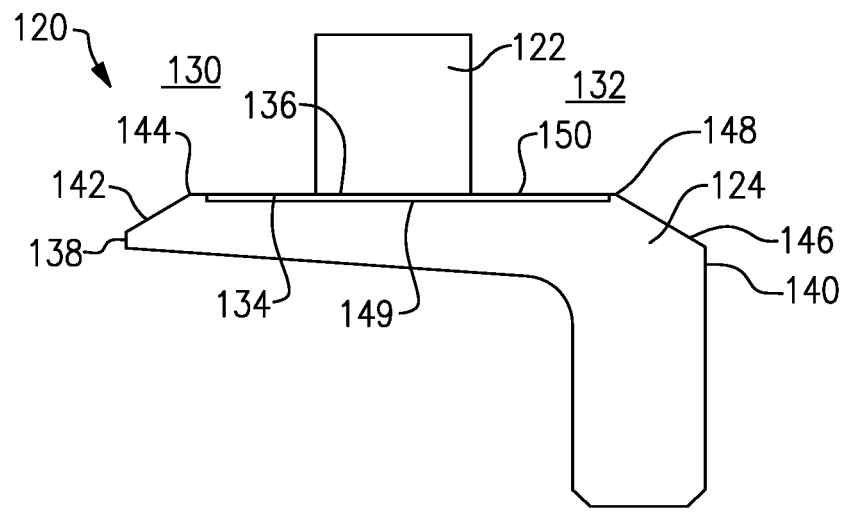
FIG. 3A schematically illustrates an exemplary seal configuration for the bearing compartment of FIG. 2.

FIG. 3A shows a portion of the bearing compartment seal 120 according to an embodiment. The runner 124 and seal ring 122 are arranged between a plenum 130 and a buffer side 132. The plenum 130 has a lower pressure than the buffer side 132. The runner 124 has a radially outer surface 134 and the seal ring 122 has a radially inner surface 136. The radially outer surface 134 extends between a first side 138 and a second side 140. In some examples, the runner 124 has a chamfer 142 at the first side 138 defining a first edge 144. The runner 124 may have a chamfer 146 at the second side 140 defining a second edge 148. In one example, the radially outer surface 134 extends between the first edge 144 and the second edge 148.

In some examples, the runner 124 may include a trench 149 and a coating 150 arranged within the trench 149. The coating 150 may be machined such that the radially outer surface 134 defines a uniform plane spanning from the first edge 144 to the second edge 148. The coating 150 may be one of tungsten carbide, chromium carbide, and hard chromium, for example. A plurality of grooves 152 (shown in FIG. 4) are formed in the radially outer surface 134, as will be shown and described further herein.

Figure 3B:
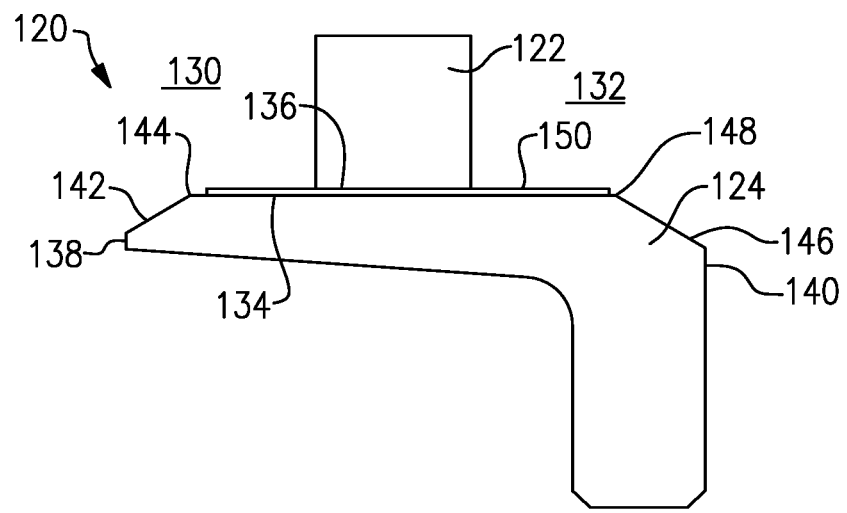
FIG. 3B schematically illustrates another exemplary seal configuration for the bearing compartment of FIG. 2.

FIG. 3B shows an embodiment wherein the runner 124 does not include a trench 149, and a coating 150 is arranged on the radially outer surface 134.

Figure 4:
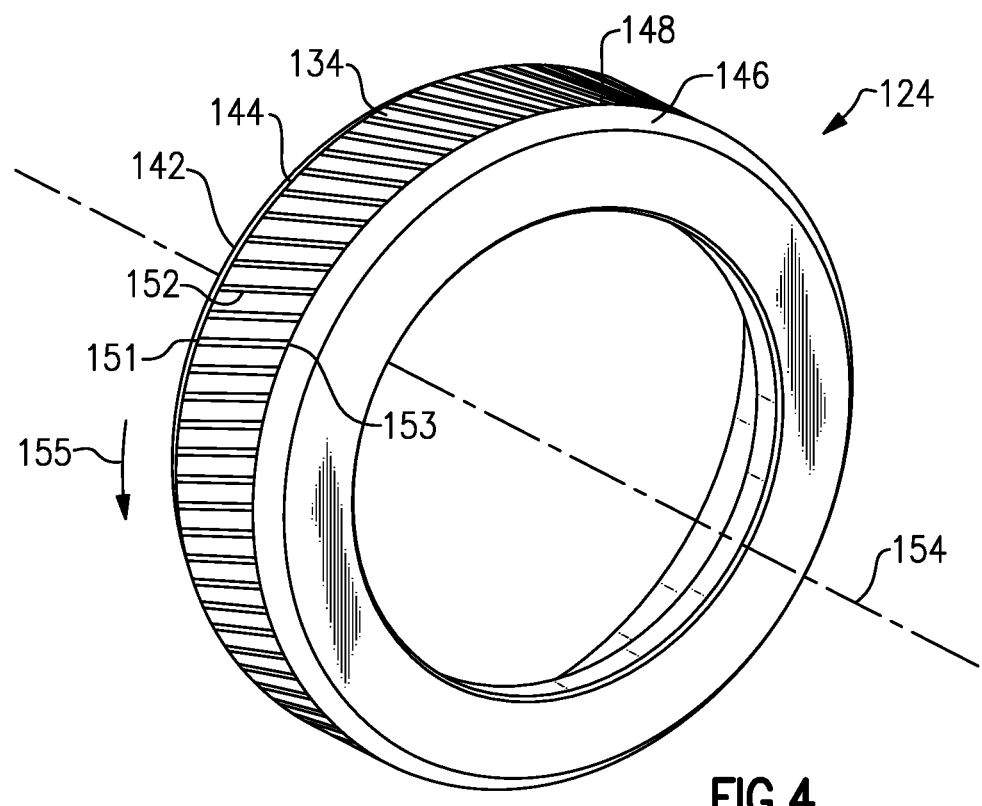
FIG. 4 illustrates an isometric view of an example seal runner according to an embodiment.

FIG. 4 shows the seal runner 124. The seal runner 124 is a ring about an axis 154. The axis 154 extends along a center of the shaft 102, for example. The radially outer surface 134 has a plurality of grooves 152. During operation, as the seal runner 124 rotates, air is pulled into the grooves 152. As the seal runner 124 rotates with respect to the seal ring 122 in a direction 155, fluid enters the grooves 152 at a leading edge 153 of a groove 152, then encounters a trailing edge 151 of the groove 152 as the seal runner 124 continues to rotate and the fluid is forced radially outward towards the seal ring 122. The pressure of the fluid on the seal ring 122 provides improved sealing by utilizing this hydrodynamic lift effect.

The grooves 152 are spaced circumferentially about the entire circumference of the ring, for example. In one example, the grooves 152 are evenly spaced from one another. The illustrated example has 78 grooves 152 spaced along the radially outer surface 134, though more or fewer grooves 152 may be used depending on the spacing and the diameter of the seal runner 124.

Figure 5:
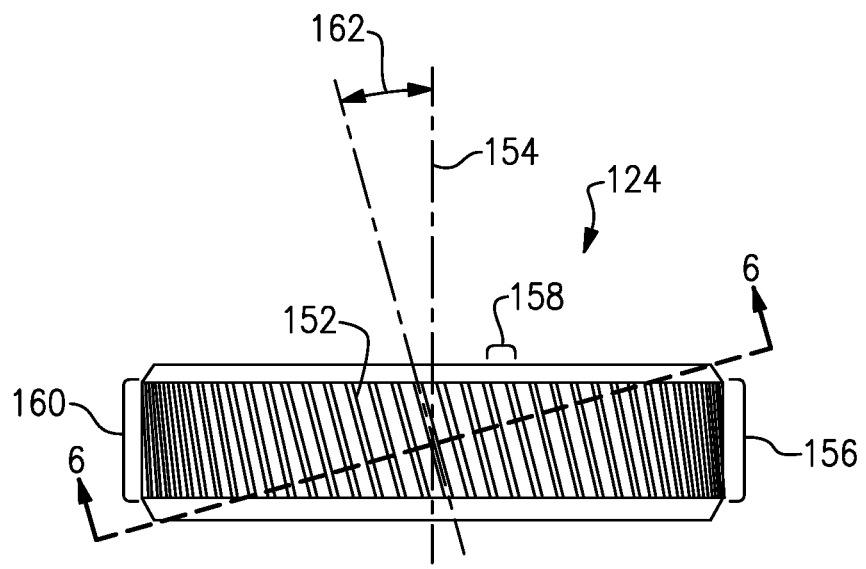
FIG. 5 shows a top view of the example seal runner of FIG. 4.

FIG. 5 shows a top view of the seal runner 124. The grooves 152 are spaced apart from one another by a distance 158. The grooves 152 extend a length 156 in the axial direction relative to the axis 154. The radially outer surface 134 extends a length 160 in the axial direction between the first edge 144 and the second edge 148. In some examples, the length 156 is the same as the length 160. In other examples, the length 156 is at least 50% of the length 160. In other examples, the length 156 is at least 70% of the length 160. The grooves 152 may be centered on the surface 134 in the axial direction. That is, there is a substantially equal space forward and aft of the grooves 152 on the runner surface 134. The arrangement of grooves 152 extending most of the axial width of the surface 134 may provide consistent performance of the seal 120 even when there is axial translation between the seal ring 122 and the seal runner 124.

The grooves 152 are arranged at an angle 162 relative to the axis 154. The angle 162 may be less than 45°, for example. In a further example, the angle 162 is less than 30°. In a further example, the angle 162 is between 13° and 17°. The angle 162 may be selected for a particular application to maximize the hydrodynamic lift effect between the seal runner 124 and the seal ring 122.

Figure 6:
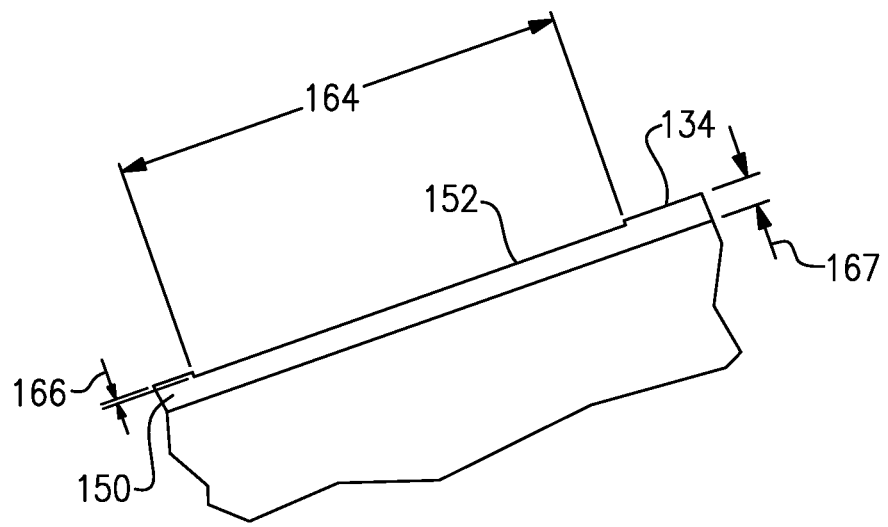
FIG. 6 shows a cross-sectional view of a portion of the seal runner of FIG. 5.

FIG. 6 shows a cross-sectional view of a portion of the seal runner taken along line 6-6 of FIG. 5. In this example, the grooves 152 have a width 164 in a direction perpendicular to the angle 162. The grooves 152 have a depth 166 in a radial direction, and the coating 150 has a thickness 167 in a radial direction. The width 164 may be between 0.045 and 0.055 inches (1.143-1.397 mm), for example. The depth 166 may be between 0.0003 and 0.0005 inches (0.00762-0.0127 mm), for example. The coating thickness 167 may be between 0.002 and 0.012 inches (0.0508-0.3048 mm), or more narrowly between 0.003 and 0.006 inches (0.0762-0.1524 mm), for example.

Thus, the depth 166 is quite small relative to the width 164. In some examples, a ratio of the width 164 to the depth 166 may be at least 90. In a further example, the ratio of the width 164 to the depth 166 is between 90 and 185. Similarly, the depth 166 is quite small relative to the coating thickness 167. In some examples, a ratio coating thickness 167 to depth 166 may be at least 4. In a further example, the ratio of coating thickness 167 to depth 166 is between 6 and 20.

The grooves 152 may be formed via laser etching, chemical etching, electrodischarge metal removal, electrochemical metal removal, electron beam metal removal, abrasive water jet machining, or ultrasonic machining for example.

Figure 7A:
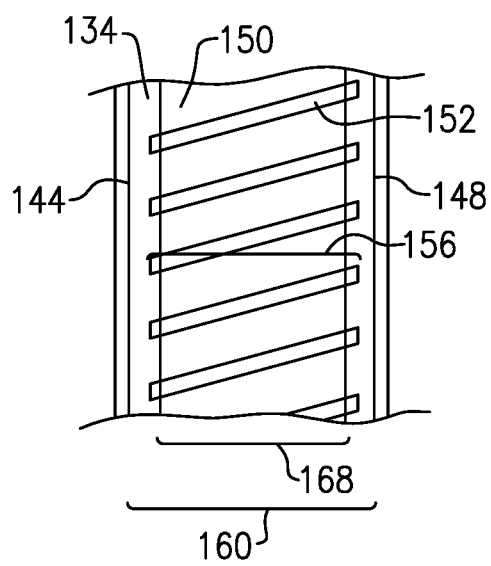
FIG. 7A shows a detail of a seal runner according to an embodiment.

FIG. 7A shows a detail of the seal runner according to an embodiment. In this example, the coating 150 has a length 168 in the axial direction that is smaller than the length 160 of the runner surface 134 between the first edge 144 and the second edge 148. The coating length 168 may be the same as the runner surface length 160, or may be smaller. In this example, the grooves 152 have a length 156 in the axial direction. In this example, the length 156 is larger than the coating length 168 and smaller than the runner surface length 160. That is, the grooves 152 extend axially beyond the coating 150. Accordingly, the grooves 152 are partially formed in the coating 150 and partially formed in outer portions of the runner surface 134 that are not defined by the coating 150. As the radially outer surface 134 defines a uniform plane (FIG. 3A), the depth 166 of the grooves 152 is uniform across the full length 156 of the grooves 152.

Figure 7B:
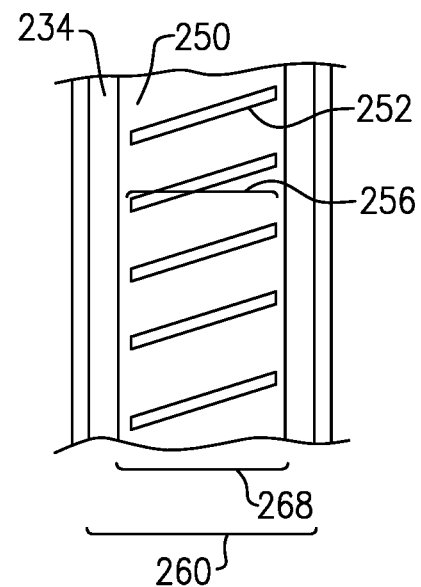
FIG. 7B shows a detail of a seal runner according to another embodiment.

FIG. 7B shows a detail of the seal runner according to another embodiment. In this example, the coating 250 has a length 268 in the axial direction that is smaller than the length 260 of the runner surface 234. In this example, the grooves 252 have a length 256 in the axial direction. In this example, the length 256 is smaller than the coating length 268. That is, the grooves 252 are entirely formed in the coating 250. The particular coating length 268 and groove length 256 may be selected based on a particular seal arrangement. Further, the grooves 152 may be formed directly in runner surface 134 without inclusion of a coating 150.

Figure 8A:
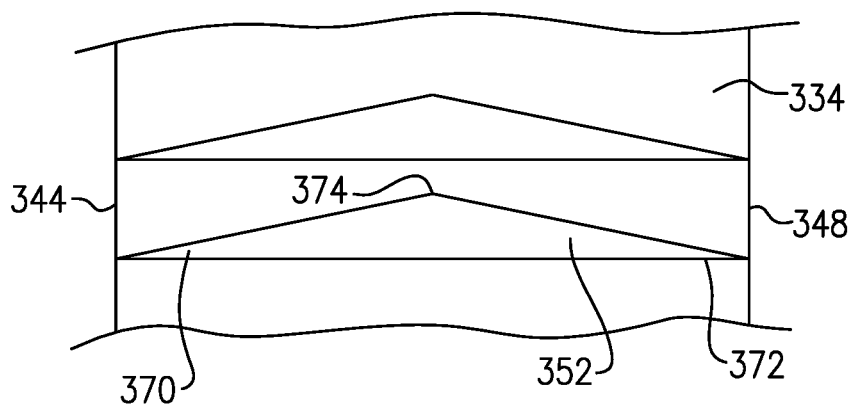
FIGS. 8A-8F show alternative arrangements of a seal runner.

FIGS. 8A-8F show alternative arrangements of the seal runner. FIG. 8A shows an example seal runner surface 334 having a plurality of triangular grooves 352. In this example, each of the triangular grooves 352 is an isosceles triangle having an apex 374 arranged approximately midway between the first edge 344 and the second edge 348. In this example, the points 370, 372 of the base of the triangle are arranged near the first and second edges 344, 348, respectively.

Figure 8B:
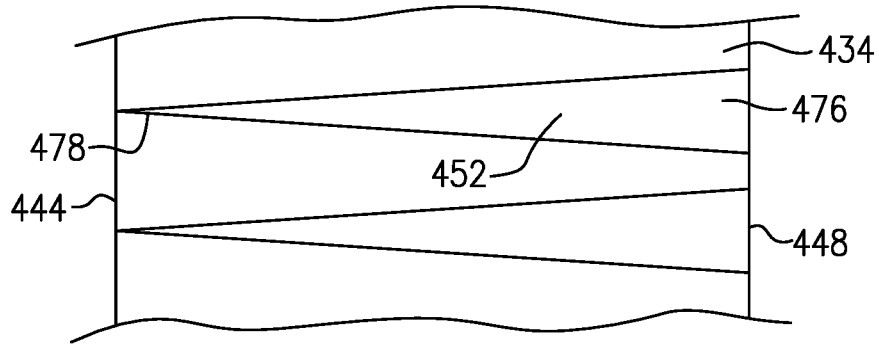

FIG. 8B shows another example seal runner surface 434 having a plurality of triangular grooves 452. In this example, each of the triangular grooves 452 is an isosceles triangle having an apex 478 near the first edge 444 and a base 476 near the second edge 448.

Figure 8C:
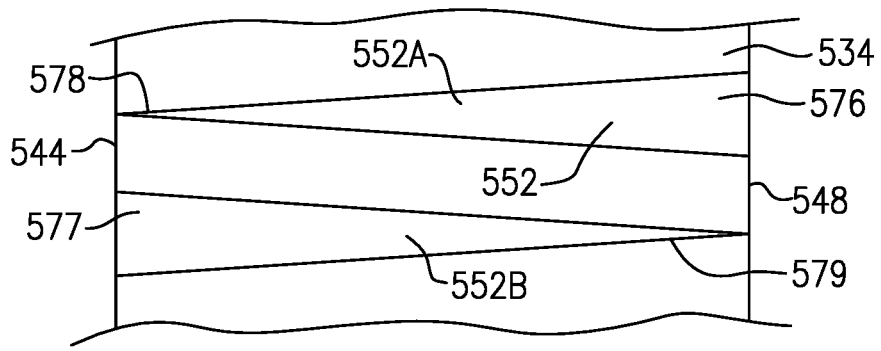

FIG. 8C shows another example seal runner surface 534 having a plurality of triangular grooves 552. In this example, each of the triangular grooves 552 is an isosceles triangle with an apex 578, 579 and a base 576, 577. In this example, the direction of the grooves 552 alternates, such that a first groove 552A has the apex 578 near the first edge 544, while a second groove 552B has the apex 579 near the second edge 548.

Figure 8D:
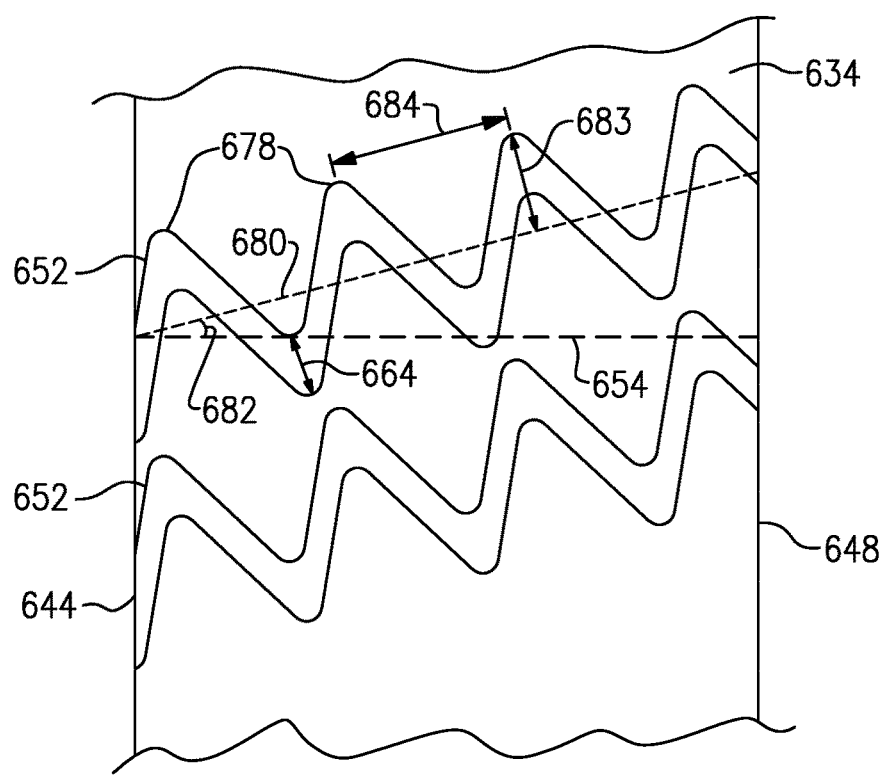

FIG. 8D shows another example seal runner surface 634 having a plurality of sinusoidal grooves 652. In this example, each of the sinusoidal grooves 652 oscillate about a baseline 680, which may be oriented at an angle 682 relative to the seal runner axis 654. The angle 682 may be less than 45°, for example. In a further example, the angle 682 is less than 30°. In a further example, the angle 162 is between 13° and 17°. The sinusoidal grooves further include a width 664 in a direction perpendicular to baseline 680. The width may be between 0.045 and 0.055 inches (1.143-1.397 mm), for example. The sinusoidal grooves 652 include a plurality of apexes 678 that are spaced from the baseline 680 by an amplitude 683 and are spaced apart from one another by a wavelength 684. Although FIG. 8D illustrates sinusoidal grooves 652 with a uniform pattern spanning from the first edge 644 to the second edge 648, seal runner surface 634 may include sinusoidal grooves 652 with none-periodic features, such as one or more compressed sections (not shown) with a decreased wavelength 684 compared to a remainder of the sinusoidal groove 652.

Figure 8E:
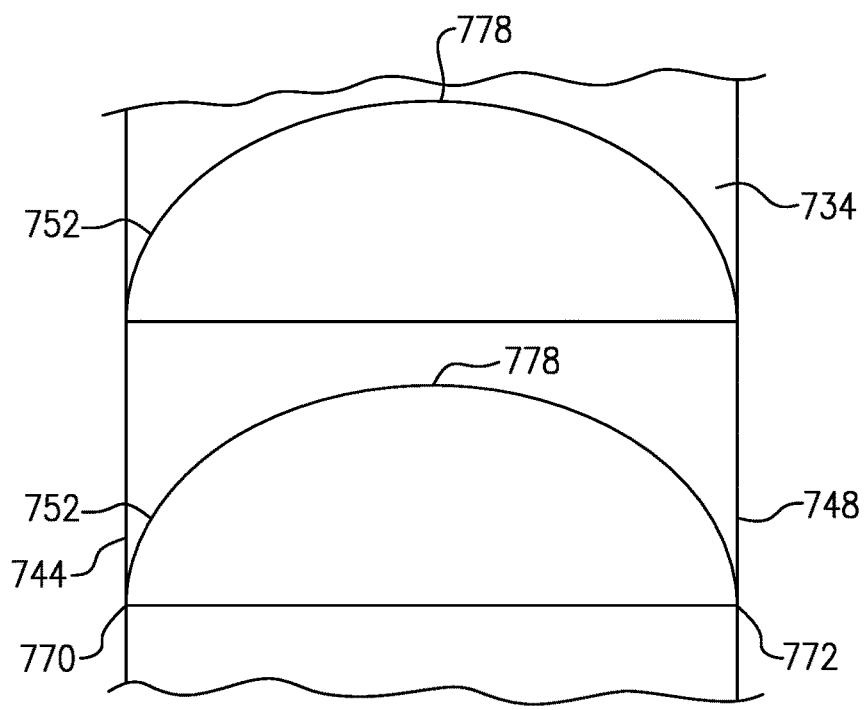

FIG. 8E shows another example seal runner surface 734 having a plurality of semicircular grooves 752. In this example, each of the grooves 752 is a bisected half of a circle or oval with an apex 778 arranged approximately midway between the first edge 744 and the second edge 748. In this example, the points 770, 772 of the base of the semicircle are arranged near the first and second edges 744, 748, respectively.

Figure 8F:
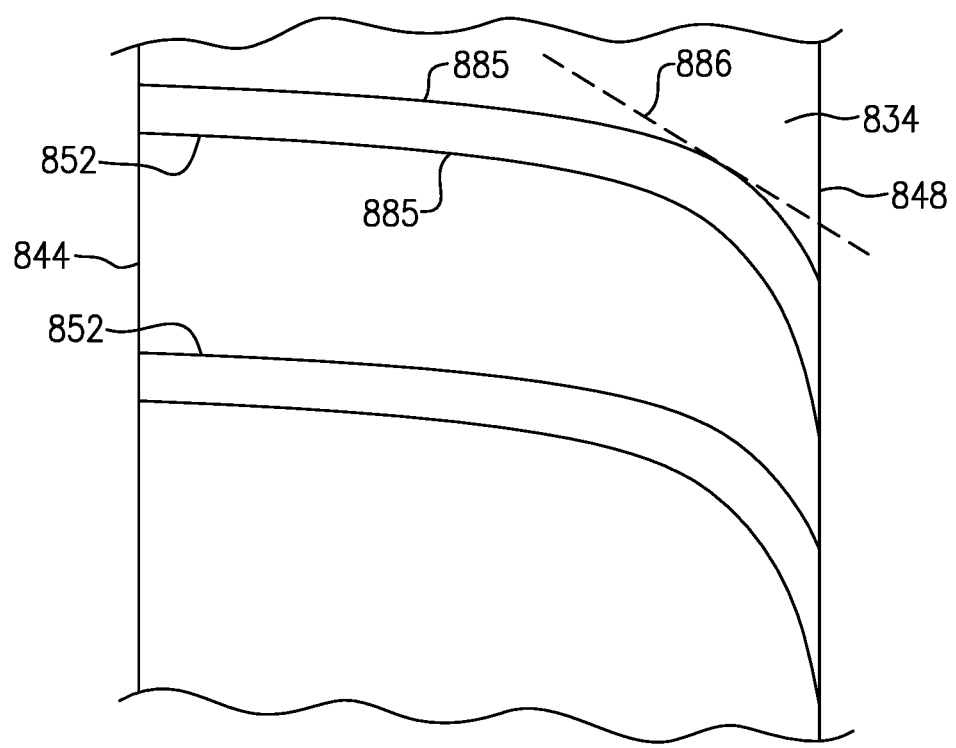

FIG. 8F shows another example seal runner surface 834 having a plurality of parabolic grooves 852. In this example, the parabolic grooves 852 include groove edges 885 each with a tangential slope 886 that becomes increasingly steep moving from the first edge 844 to the second edge 848 to generally define a parabolic shape. These groove arrangements may be implemented in combination with any of the other seal ring and/or seal runner features described in this disclosure.

Some known bearing compartment seals contact one another for sealing. However, these seals may have higher parasitics, heat generation, and/or air flow considerations. Some other known bearing compartment seals include grooves along a portion of the radially outer surface for generating hydrodynamic lift. However, these grooves extend along only a portion of the surface in the axial direction. These known arrangements may have performance loses if the seal ring and the runner shift in the axial direction. The disclosed arrangement provides hydrodynamic lift grooves 152 across most or all of the runner surface 134, which provides more consistent performance independent of axial translation due to thermal-mechanical differences. The disclosed grooves 152 are also arranged to optimize the hydrodynamic effect for a particular application. The coating 150 may provide additional protection during conditions where the runner surface 134 may contact seal ring 122, such as low power conditions where hydrodynamic lifting forces may not be sufficient to remove the runner surface 134 from contact, or in high power conditions where deformation may lead to transient touchdowns of the runner surface 134. This arrangement may reduce radial wear, reduce heat and parasitic losses, and reduce oil cooling requirements. The disclosed seal arrangement may provide improved reliability, customer satisfaction, and reduce heat generation, oil cooling requirements, and engine overhaul cycle requirements.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

Although an embodiment of this invention has been disclosed, a worker of ordinary skill in this art would recognize that certain modifications would come within the scope of this disclosure. For that reason, the following claims should be studied to determine the true scope and content of this disclosure.

What is claimed is:

1. A bearing compartment seal for a gas turbine engine, comprising:
    a seal ring defining an axis and having a radially inward facing sealing surface;
    a seal runner configured to rotate relative to the seal ring, the seal runner having a runner surface facing the radially inward facing sealing surface, wherein a plurality of grooves are spaced circumferentially along the runner surface, the plurality of grooves having a length in an axial direction that is at least 50% of an axial length of the runner surface;
    wherein the runner surface has a coating that extends a coating length along a portion of the runner surface in the axial direction, the plurality of grooves at least partially formed in the coating; and
    wherein an axial length of the grooves is larger than the coating length.

2. The bearing compartment seal of claim 1, wherein the length of the plurality of grooves in the axial direction is at least 70% of an axial length of the runner surface.

3. The bearing compartment seal of claim 1, wherein the sealing surface has a first edge spaced from a second edge in an axial direction to define the axial length of the runner surface, the seal runner has a first chamfer at the first edge and a second chamfer at the second edge.

4. The bearing compartment seal of claim 1, wherein the plurality of grooves each extend at an angle less than 45° relative to the axis.

5. The bearing compartment seal of claim 1, wherein the plurality of grooves each extend at an angle between 13° and 17° relative to the axis.

6. The bearing compartment seal of claim 1, wherein the coating includes a coating thickness and a depth of the grooves is less than the coating thickness.

7. The bearing compartment seal of claim 6, wherein a ratio of coating thickness to the depth of the grooves is at least 4.

8. The bearing compartment seal of claim 1, wherein a ratio of a width of the grooves to a depth of the grooves is at least 90.

9. The bearing compartment seal of claim 1, wherein the coating is one of tungsten carbide, chromium carbide, and hard chromium.

10. The bearing compartment seal of claim 1, wherein the grooves have a triangular shape.

11. The bearing compartment seal of claim 1, wherein the grooves have a sinusoidal shape oscillating about a baseline that is angled relative to the axis.

12. The bearing compartment seal of claim 1, wherein the grooves have a semicircular shape.

13. The bearing compartment seal of claim 1, wherein the grooves have a parabolic shape.

14. A gas turbine engine, comprising:
    an engine core comprising a compressor, a combustor fluidly connected to the compressor, and a turbine fluidly connected to the combustor;
    an engine static structure supported relative to a shaft within the core via at least one bearing system disposed within a bearing compartment;
    a bearing compartment seal disposed in the bearing compartment, the bearing compartment seal having a seal ring extending about the engine axis and having a radially inward facing sealing surface and a seal runner configured to rotate relative to the seal ring, the seal runner having a runner surface facing the radially inward facing sealing surface, wherein a plurality of grooves are spaced circumferentially along the runner surface, the plurality of grooves having a length in an axial direction that is at least 50% of an axial length of the runner surface;
    wherein the runner surface has a coating that extends a coating length along a portion of the runner surface in the axial direction, the plurality of grooves at least partially formed in the coating; and
    wherein an axial length of the grooves is larger than the coating length.

15. The gas turbine engine of claim 14, wherein the sealing surface has a first edge spaced from a second edge in an axial direction to define the axial length of the runner surface, the seal runner has a first chamfer at the first edge and a second chamfer at the second edge.

16. The gas turbine engine of claim 14, wherein the plurality of grooves each extend at an angle less than 45° relative to the axis.

17. The gas turbine engine of claim 14, wherein the seal ring is supported axially forward and aft by a housing.

18. The gas turbine engine of claim 14, wherein the coating includes a coating thickness and a depth of the grooves is less than the coating thickness.

19. The gas turbine engine of claim 14, wherein a ratio of a width of the grooves to a depth of the grooves is at least 90.

20. The gas turbine engine of claim 14, wherein the coating is one of tungsten carbide, chromium carbide, and hard chromium.

* * * * *